United States Patent [19]

Corompt

[11] 4,147,266
[45] Apr. 3, 1979

[54] SEMI-TRAILER FOR HANDLING AND TRANSPORTING STANDARDIZED CONTAINERS

[75] Inventor: Antoine Corompt, Saint-Etienne, France

[73] Assignee: Bennes Marrel, Andrezieux Boutheon, France

[21] Appl. No.: 779,287

[22] Filed: Mar. 18, 1977

[30] Foreign Application Priority Data

Mar. 19, 1976 [FR] France ................. 76 08616

[51] Int. Cl.² .......................................... B60P 1/04
[52] U.S. Cl. ........................... 414/480; 294/81 R; 414/498
[58] Field of Search .............. 214/505, 506, 515, 77, 214/146.5; 298/12, 17 SG; 294/81 R, 81 SF

[56] References Cited

U.S. PATENT DOCUMENTS 3,638,817  2/1972  Corompt ........................ 214/77
3,892,323  7/1975  Corompt ........................ 214/505
3,899,205  8/1975  Lanigan et al. .............. 294/81 SF

FOREIGN PATENT DOCUMENTS 2248350  10/1971  Finland ........................ 214/505
536826   5/1941  United Kingdom ............. 298/17 SG Primary Examiner—Francis S. Husar
Assistant Examiner—Lawrence E. Williams
Attorney, Agent, or Firm—Remy J. VanOphem

[57] ABSTRACT

The invention relates to an improved semi-trailer for transportation and handling of standardized containers.

The semi-trailer comprises a main chassis 1 and a pivoting chassis 4 connected to each other by front connecting rods 5 and rear connecting rods 6, the latter comprising a transverse spindle 16 which slides in apertures 18 in the chassis 4, itself provided with a bracket 21–22 whose free end is provided with a transverse pivot bar 33 intended to engage on the front upper corner fittings of the standardized container.

10 Claims, 18 Drawing Figures

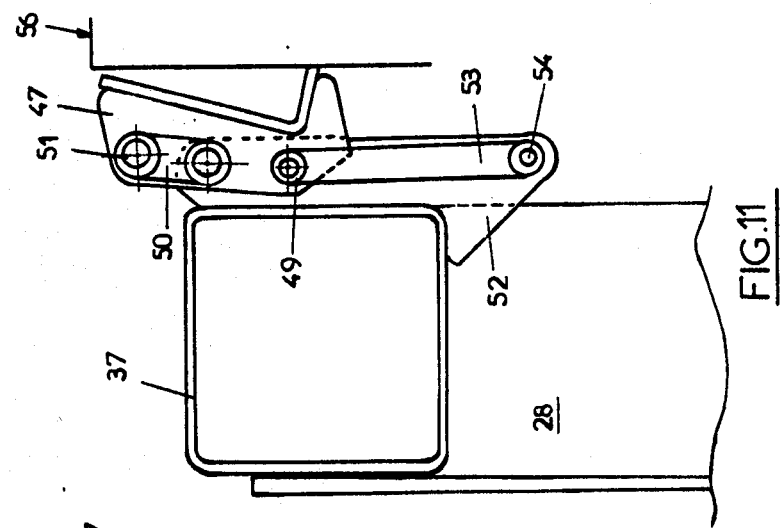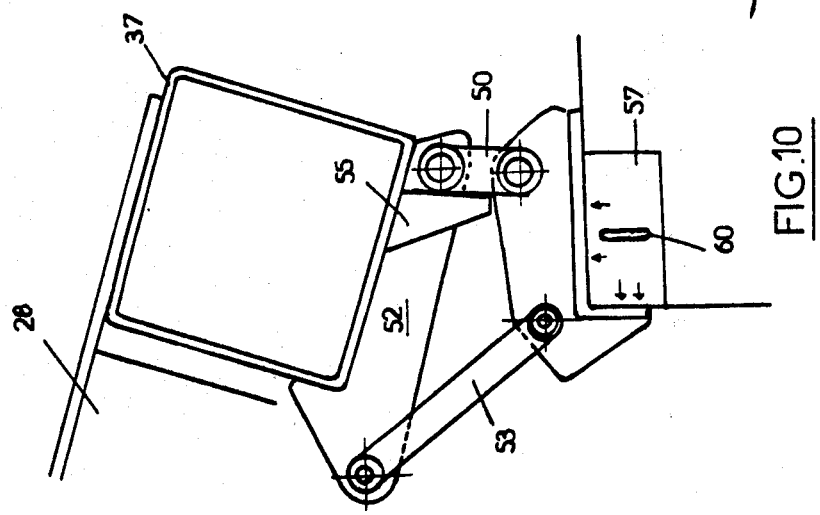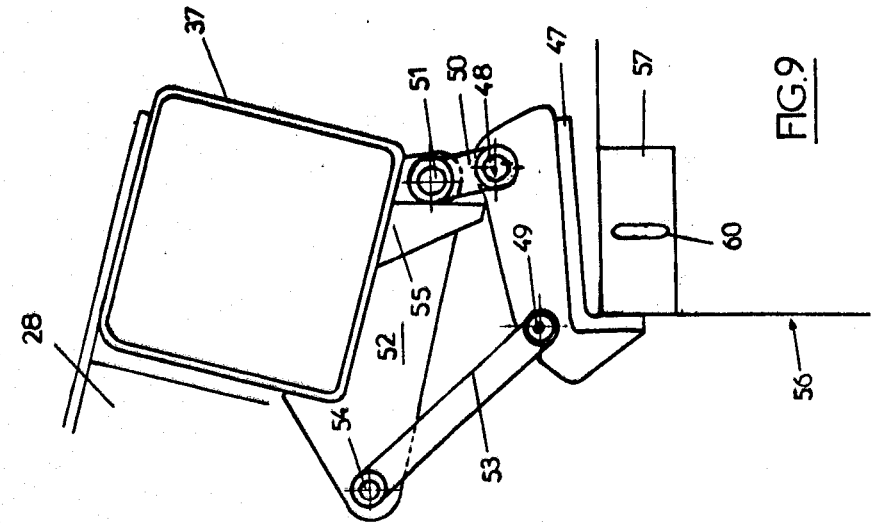

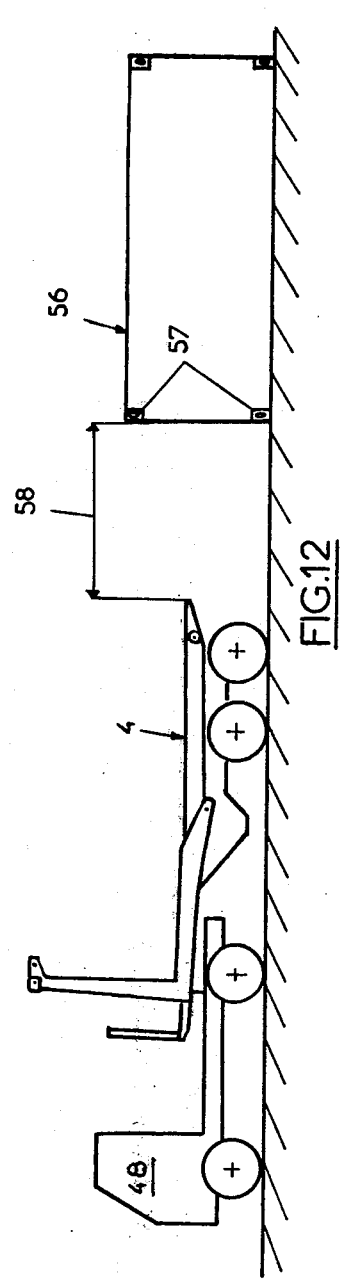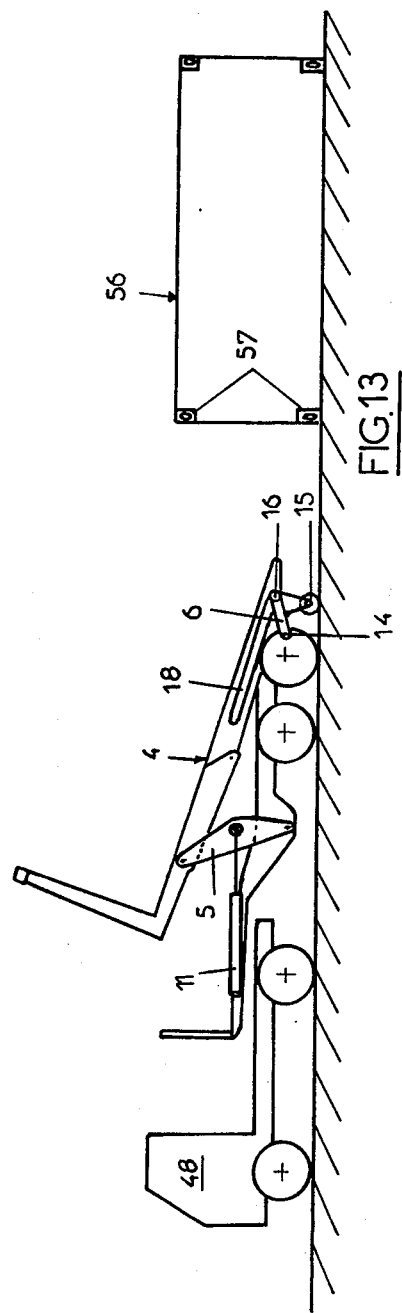

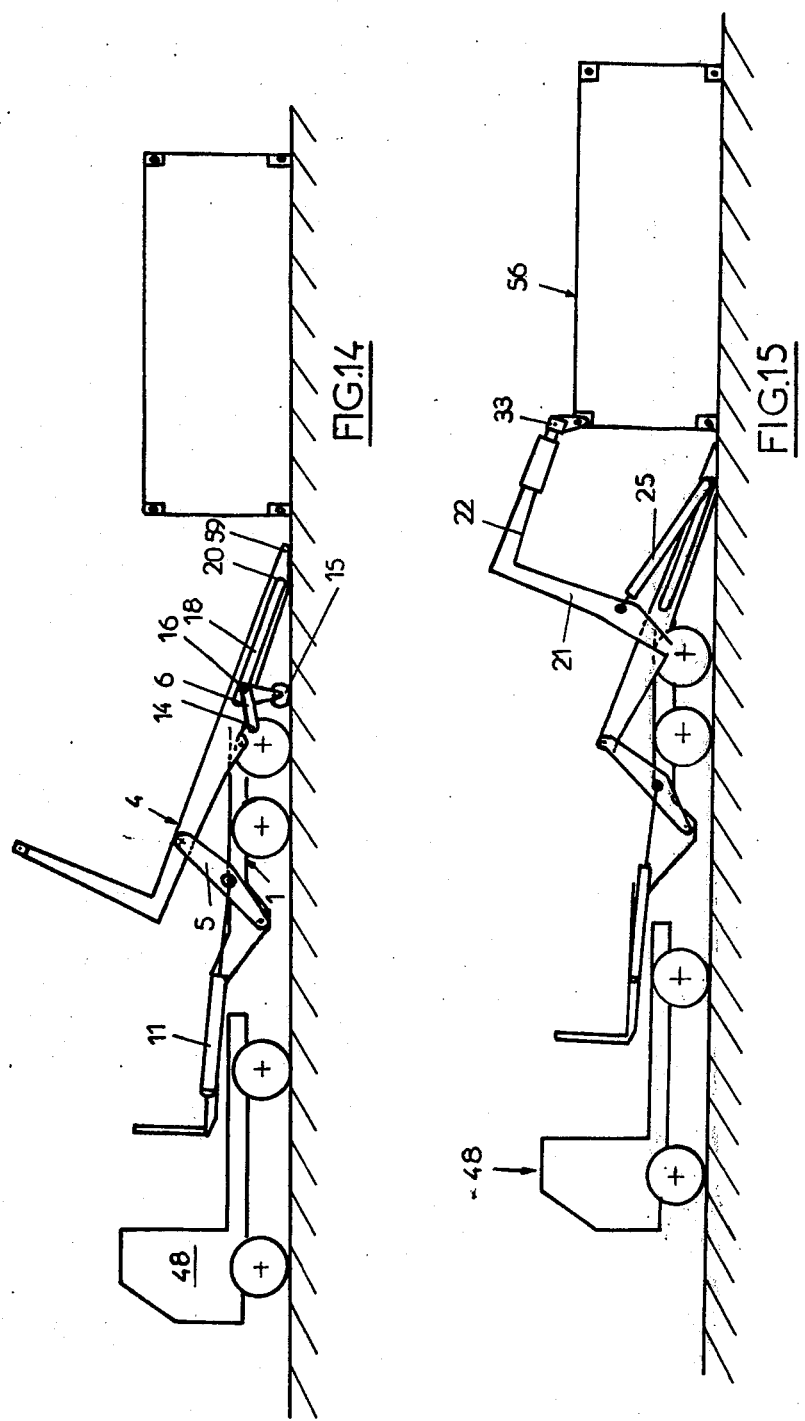

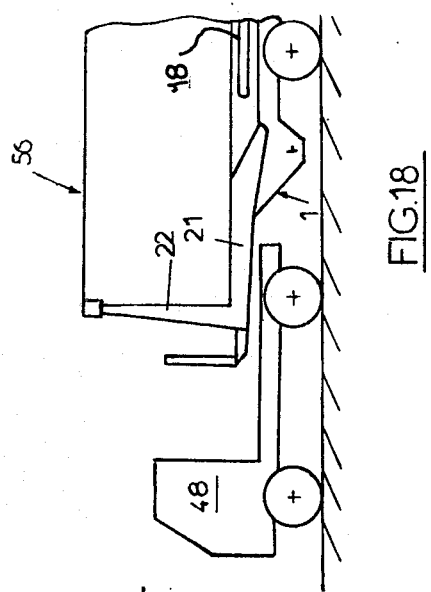
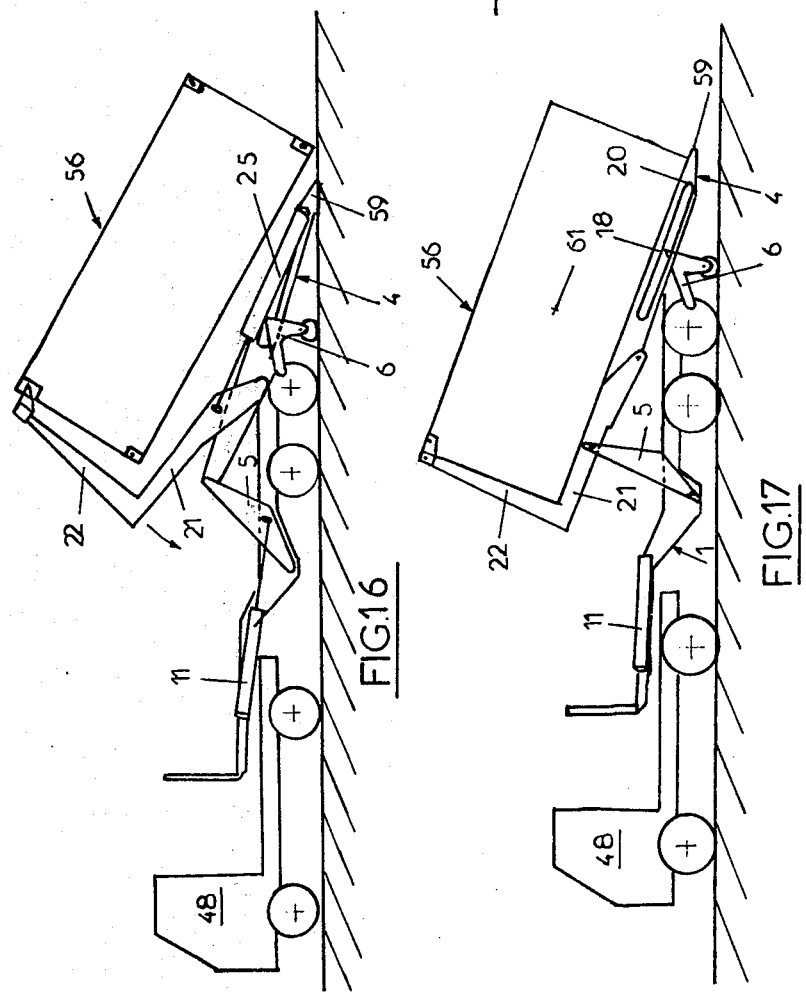

SEMI-TRAILER FOR HANDLING AND TRANSPORTING STANDARDIZED CONTAINERS

The present invention relates to an improved semi-trailer for the handling and transportation of "ISO" (or standardised) containers.

A vehicle of this type is described in French Pat. No. 1,588,282 in the name of the present Applicant. Containers of standardised dimensions and weight are of the type currently used in international land, sea or air transport.

These containers comprise certain variable elements as regards the structure of their reinforcements. These reinforcements are constituted in particular by cross-members or side-members arranged under the base of the container and they may be incompatible with certain handling equipment on which the container is intended to rest by its base, whilst moving longitudinally in order to be loaded on the vehicle.

The imcompatibility is obvious if the container comprises only cross-members and no lower side-members to be supported on running gear provided on the chassis of the vehicle. If lower side-members do exist, the latter should also have a solid web in order to be able to withstand local stresses when the container moves forwards whilst supported on rollers. However, containers frequently have lower side-members whose web has an opening, to facilitate the passage of handling forks for example.

The present invention intends to provide a semi-trailer vehicle capable of loading a standardised container or of discharging it without the latter having to move whilst being supported other than at its front or rear ends.

A semi-trailer vehicle according to the invention comprises a main chassis on which a false chassis is mounted by means of two pairs of connecting rods, namely a front pair of connecting rods controlled by at least one substantially horizontal double-acting ram pivoted by horizontal transverse pivots on the one hand on the central part of the chassis and on the other hand on the front of the false chassis and a rear pair of connecting rods whereof one of the ends is pivoted on the rear of the chassis by a substantially horizontal transverse pivot and is characterized in that the other end of each rear connecting rod supports a transverse roller which slides in a longitudinal guide of the false chassis, or pivoting chassis, such that during the forwards pivotal movement of the front connecting rods, the rear end of the guide abuts against the spindle for bringing about pivoting of the rear connecting rods.

According to an additional feature of the invention, the guide comprises an extension directed upwards at its rear end, the rollers engaging in this extension as soon as the rear end of the guide arrives at the level of the spindle, whereas, when the front connecting rods are at the end of their forwards pivoting movement, the transverse pivot point for the rear connecting rods is located at the rear of the pivot for the spindle.

According to an additional feature of the invention, the rear connecting rods enclose the pivoting chassis, or false chassis, whereas they are each extended by an arm whose free end is connected to one end of a roller supported on the ground, this roller being fixed between the two connecting rods which have a bent shape in a substantially vertical and longitudinal plane.

According to an additional feature of the invention, the false chassis is provided with a bracket which pivots about a substantially horizontal transverse pivot, this bracket comprising two parts at right-angles to each other, namely a main part whose base is pivoted on the central part of the false chassis and whose central part is pivoted on one end of a control ram whose opposite end is pivoted at a point located towards the rear on the false chassis and an auxiliary part whose free end comprises means for anchoring on a container or the like.

According to an additional feature of the invention, the anchoring means provided at the free end of the auxiliary part of the bracket are constituted by a pivot bar mounted "to float" on said part such that the major axis of the pivot bar oscillates about a substantially horizontal and transverse position.

According to an additional feature of the invention, the pivot bar is integral with a transverse pivot itself engaged by its ends in two side-plates engaged on either side of the pivot bar, the axis of said pivot remaining substantially parallel to the major axis of the main part of the bracket, the first side-plate, located adjacent the base of the bracket, comprising a circular aperture which receives said pivot with slight clearance, whereas the second side-plate, located opposite the base of the bracket with respect to the pivot bar, comprises an aperture elongated at right-angles to the plane defined by the two parts of the bracket.

According to an additional feature of the invention, each end of the pivot bar is provided with a pivoting door whose central part is pivoted on the pivot bar and whereof one of the ends is connected to control means intended to control pivoting of said door and whose opposite end comprises, on its inner side, a peg able to engage inside a hole provided on the corner fitting of a standardised container.

According to an additional feature of the invention, the means controlling pivoting of the doors comprise, on each side of the pivot bar, a lever which is pivoted by three aligned pivots respectively on a fixed point of the pivot bar, on a first end of a connecting rod whose other end is pivoted on one end of the corresponding door and finally on one of the ends of a central ram itself pivoted by the two levers for simultaneously actuating the two doors, the arrangement of the pivoted mechanism comprising parallel pivots being provided such that at the end of the closing movement of the doors of the pivoted mechanism, each lever slightly exceeds a position in which the pivot point of the connecting rod on the lever is firstly situated between the pivot point of the lever on the pivot bar and a pivot point of the connecting rod on the door and is secondly aligned with these two pivots.

According to an additional feature of the invention, the pivot bar is provided adjacent the base of the bracket, with an angle member which extends parallel to the major axis of the pivot bar, on which it is pivoted along axes parallel to this same direction through the intermediary of two connecting rods, namely a first connecting rod, located opposite the base of the auxiliary part of the bracket and a second connecting rod located adjacent the base of said auxiliary part of the bracket and whose pivot points are further apart than those of the first connecting rod.

According to an additional feature of the invention, the auxiliary part of the bracket supports, at its end, a slide which can be inserted in several positions to facilitate handling of standardised containers of different heights.

According to an additional feature of the invention, the pivot bar is integral with an abutment which limits pivotal movement of the first connecting rod in the direction of the base of the auxiliary part of the bracket, the pivoted mechanism being provided such that when the pivot bar approaches the front upper edge of a container, the two internal sides of the angle member each engage against the edge of one side of the container to retain the pivot bar in a position in which it is possible to control pivoting of the doors so that the pegs each engage reliably in a lateral hole in a corner fitting of the container, whereas subsequently, when the bracket pivots towards the front of the vehicle thus raising the front of the container, the pegs move slightly in the elongated holes to facilitate release of the angle member, rotation of the pivot bar with respect to the container also creating a driving moment which has the result of controlling retraction of the angle member.

The accompanying drawings given as a non-limiting example, will make it easier to understand the features of the invention.

FIGS. 9 to 11 are sections IX—IX of the pivot bar, showing the pivoted angle member and the various stages of its operation.

FIGS. 12 to 18 are side views illustrating the various stages of operation of the semi-trailer.

Figure 1:
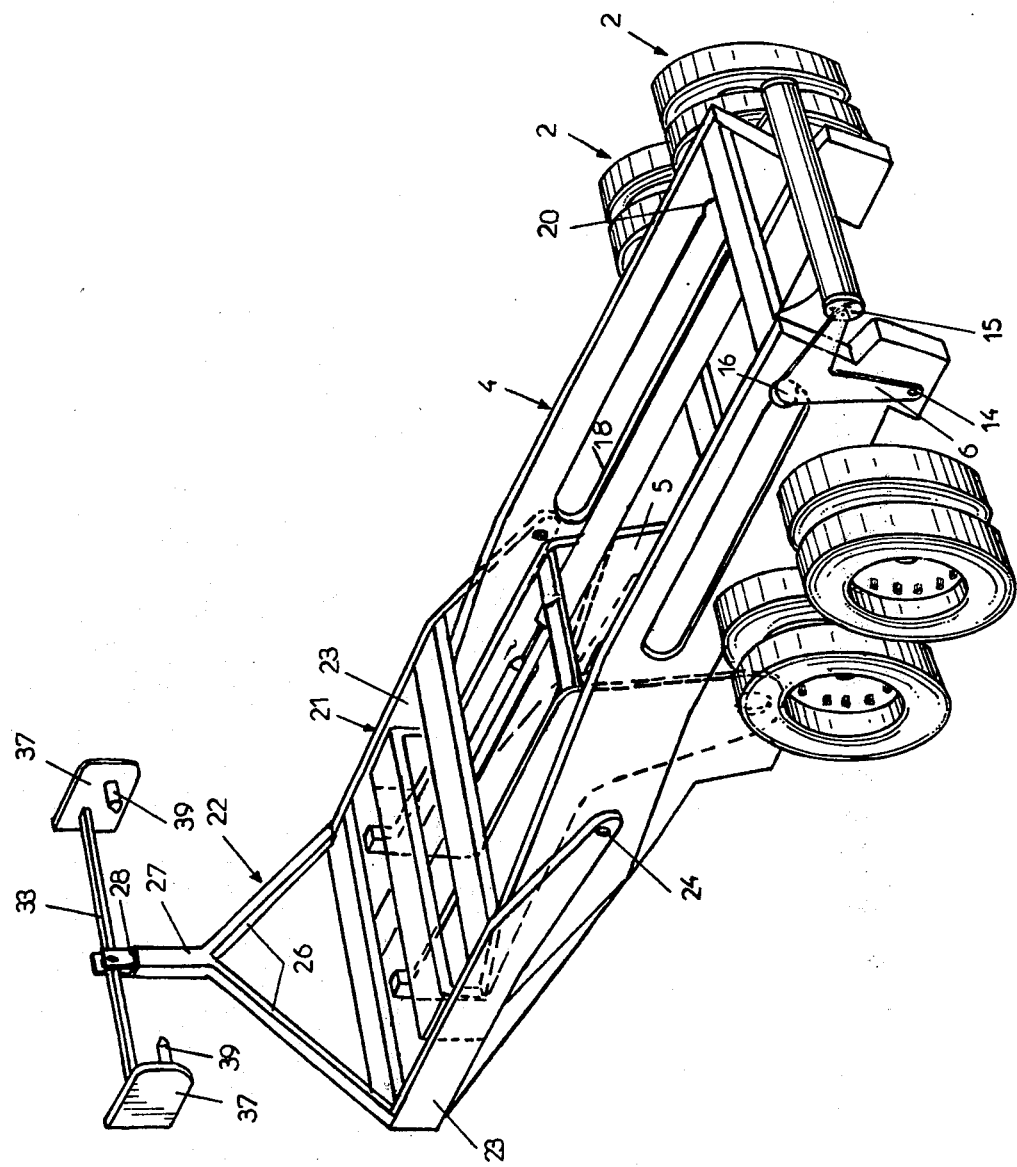
FIG. 1 is a perspective view of a semi-trailer according to the invention.
Figure 2:
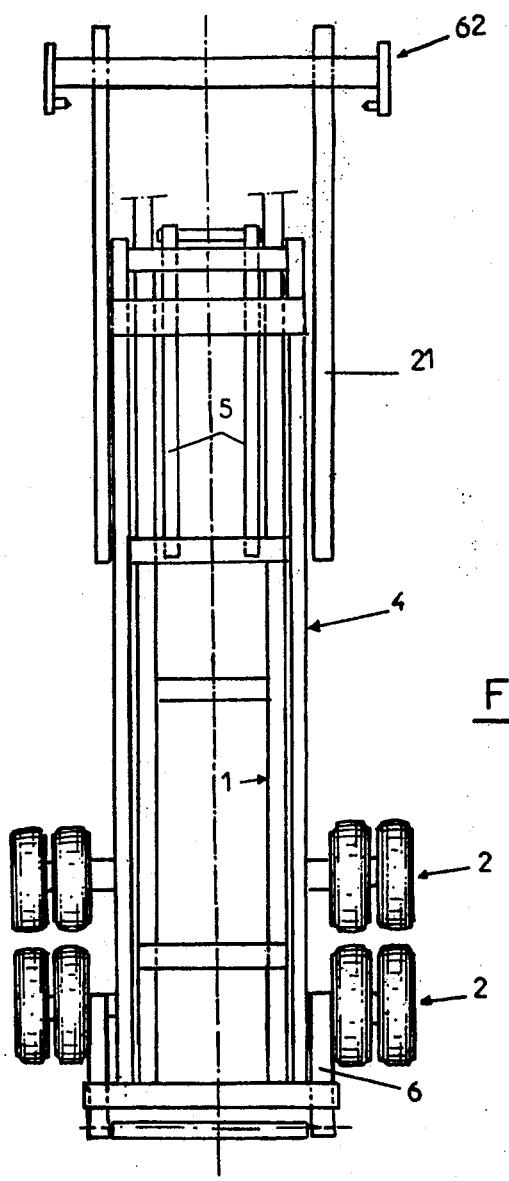
FIG. 2 is a plan view of this semi-trailer.
Figure 3:
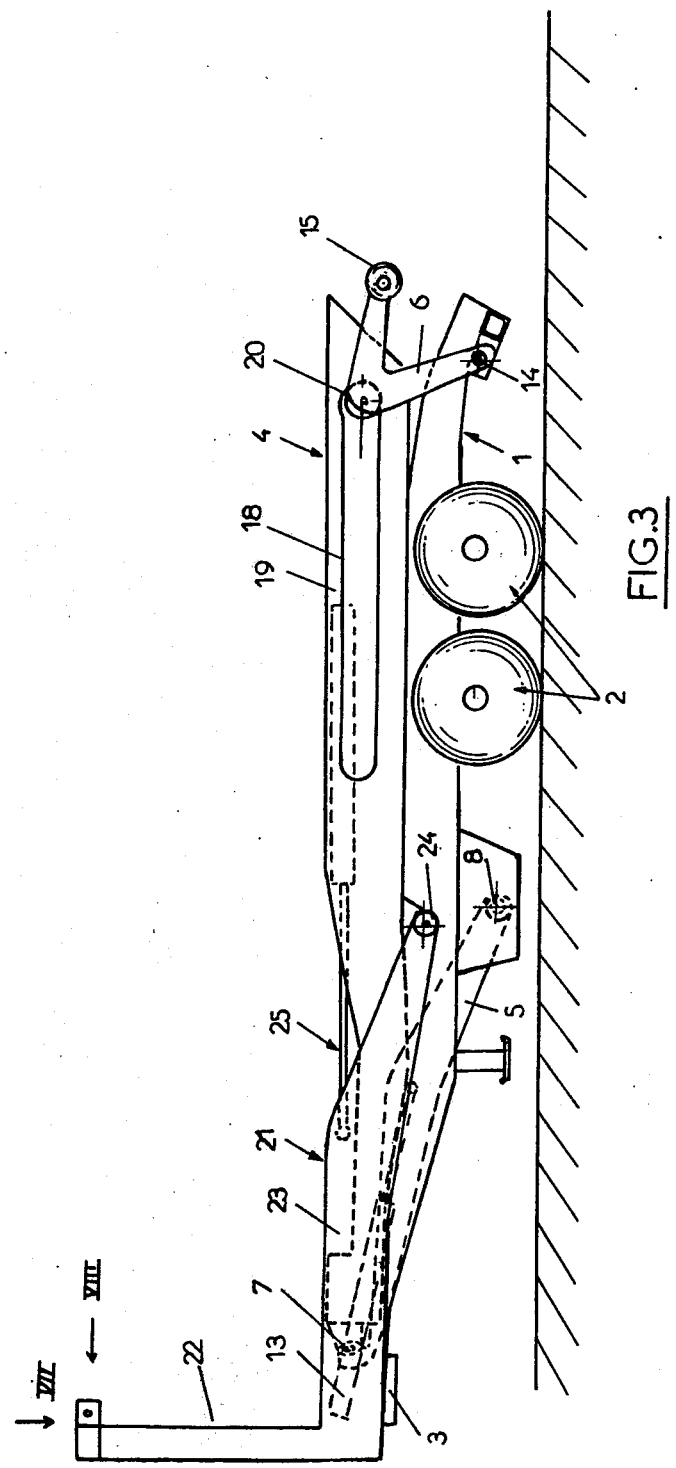
FIG. 3 is a side view of this semi-trailer.
Figure 4:
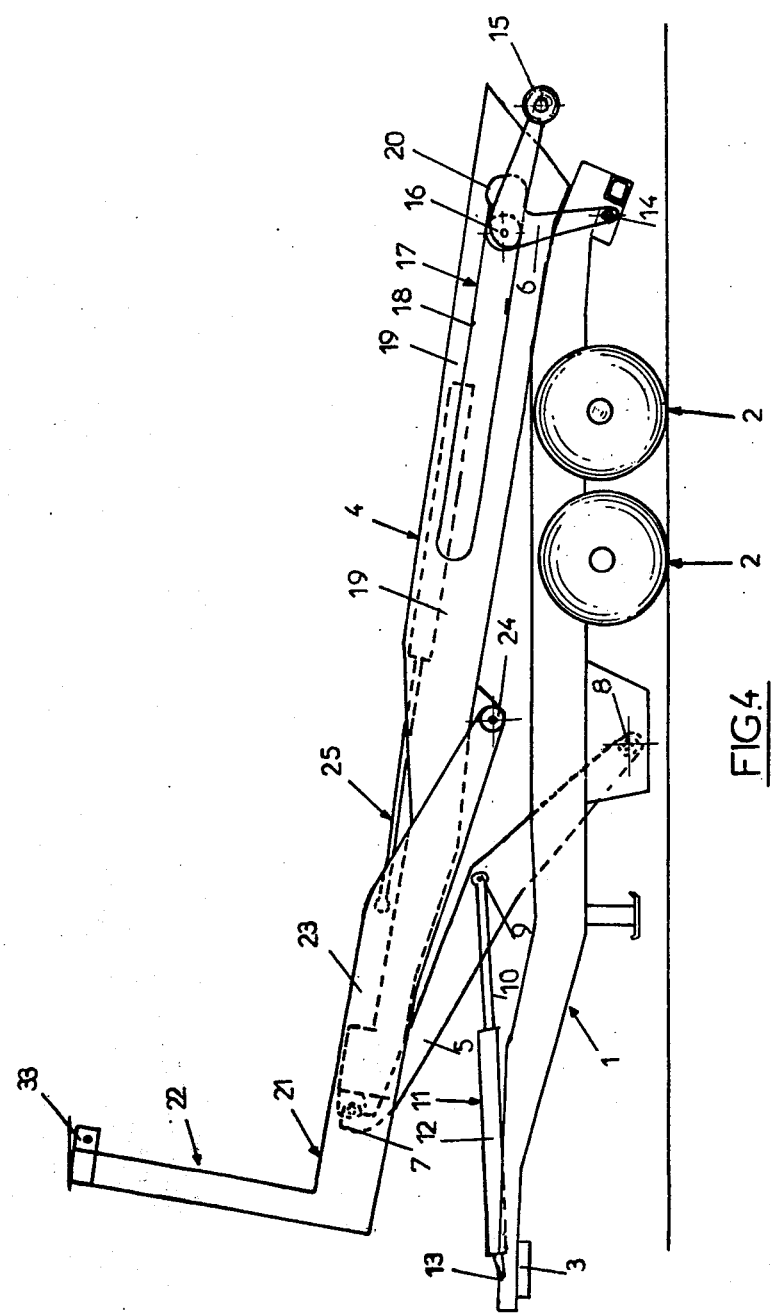
FIGS. 4 and 5 are other side views of the semi-trailer illustrating the successive stages of operation.
Figure 5:
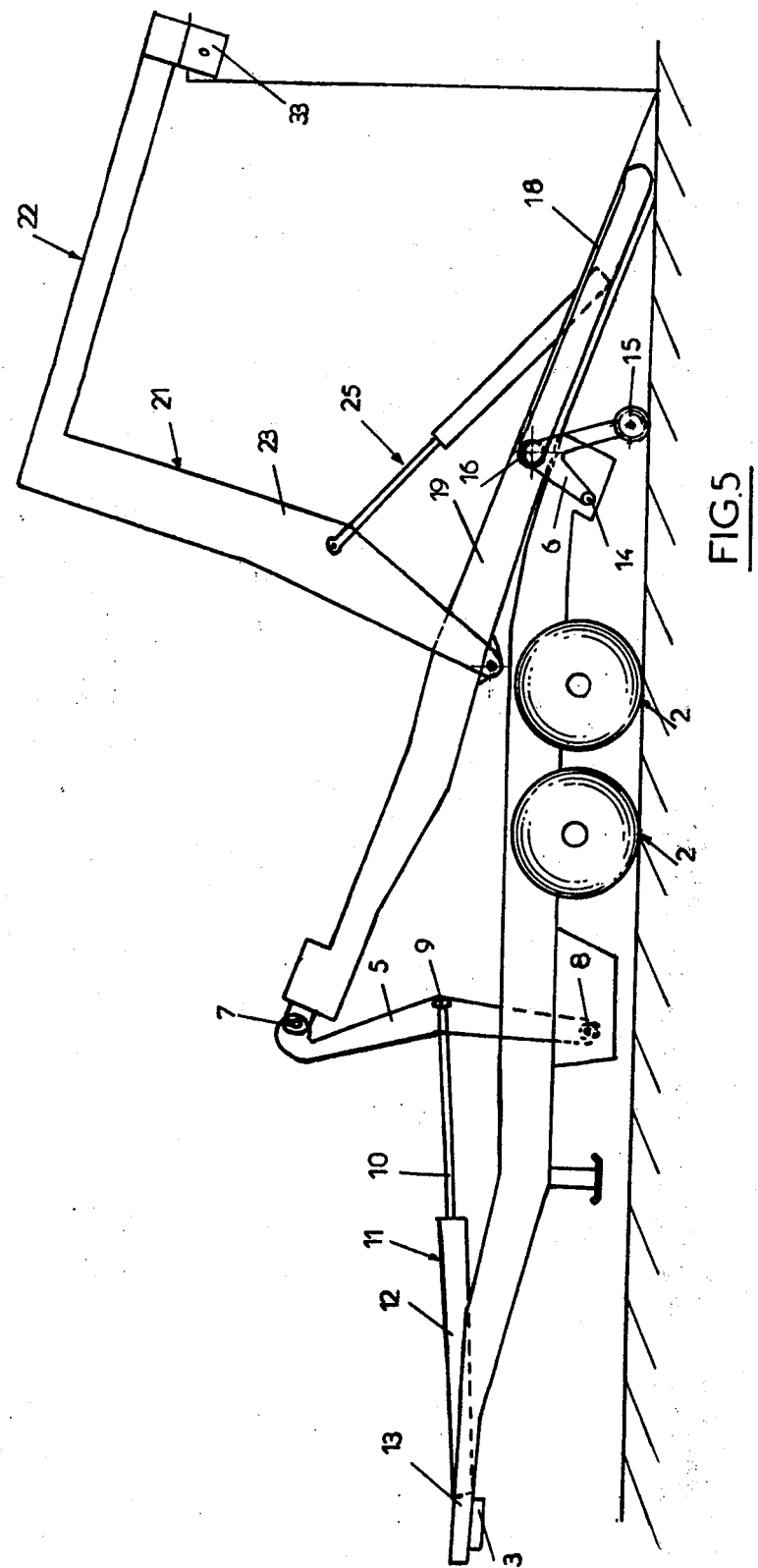

FIGS. 1 to 3 in particular show a semi-trailer according to the invention, with a main chassis 1, provided, towards the rear, with two axles 2 and, towards the front, with a swan's neck 3 intended to bear on the coupling plate of a road tractor. The main chassis 1 is surmounted by a tilting false chassis 4, to which it is connected by means of a front pair of connecting rods 5 and a rear pair of connecting rods 6. The front connecting rods 5 and a rear pair of connecting rods 6. The front connecting rods 5 are pivoted between a front transverse pivot 7 of the tilting chassis and a transverse pivot 8 at the centre of the main chassis 1. The connecting rods 5 are also each pivoted to the free end of the rod 10 of a ram 11 by a transverse pivot 9 located approximately at the centre of said connecting rods. The free end of the cylinder 12 of each ram 11 is pivoted on a front transverse pivot 13 of the main chassis 1. The rear connecting rods each form a bend in a longitudinal vertical plane of the semi-trailer and they are pivoted by one of their ends on a transverse pivot 14 at the rear of the chassis 1, their other free end supporting the same transverse stabilising roller 15 by means of which they are connected. The two connecting rods 6 simultaneously enclose the main chassis 1 and the pivoting false chassis 4, whereas they are each connected, by their bend, to a roller 16 which passes through a guide 17 of the false chassis 4.

The guide 17 is composed of two apertures 18 provided longitudinally in the side-members 19 of the pivoting false chassis, each aperture having an extension 20 directed upwards and at its rear end.

The pivoting false chassis 4 is provided with a bracket which comprises a main part 21 and an auxiliary part 22 at right-angles to each other. The main part 21 comprises a pair of side-members 23 whose base is pivoted on the false chassis along a transverse axis 24 passing through the central part of the two side-members 19. Each side-member 23 is connected to the side-member 19 located on the same side by means of a ram 25, whose rod is pivoted on the central part of the side-member 23 and whose cylinder is pivoted on the rear part of the side-member 19.

Figure 6:
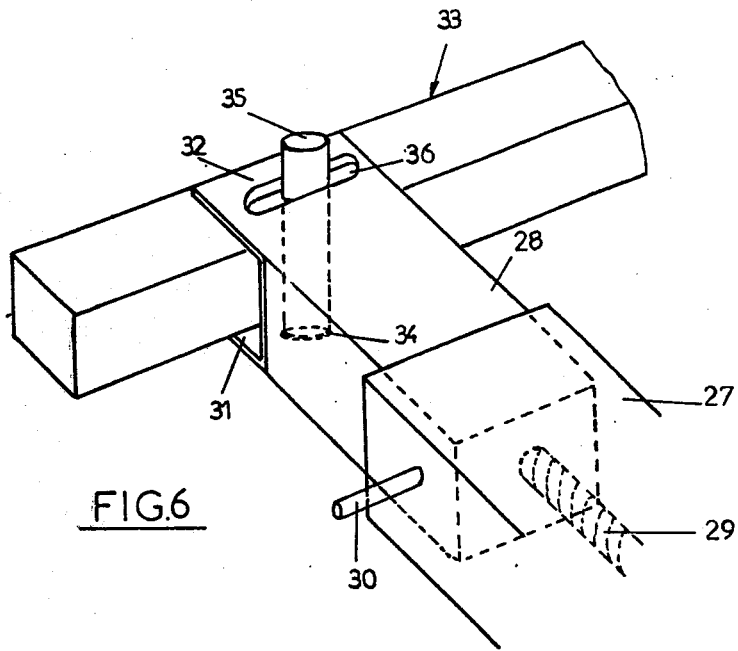
FIG. 6 is a partial perspective view, showing the connection between the pivot bar and the bracket.

The auxiliary part 22 of the bracket comprises a pair of oblique bars 26 which are each connected to one end of the side-member 23 by the base, in order to join in the central section of the part and be extended by a telescopic rod comprising an external part 27 in which an internal part 28 slides under the action of a longitudinal screw 29 immobilised axially in the external part 27. The screw 29 is integral with a handle (not shown) which makes it possible to rotate the latter, thus screwing it to a greater or lesser extent into a screwthreaded hole in the base of the internal part 28. A transverse spindle 30 passes simultaneously through the two parts 27 and 28 of the telescopic rod in order to lock them in several relative positions defined by the location of holes provided for receiving said spindle 30 (FIG. 6).

Figure 7:
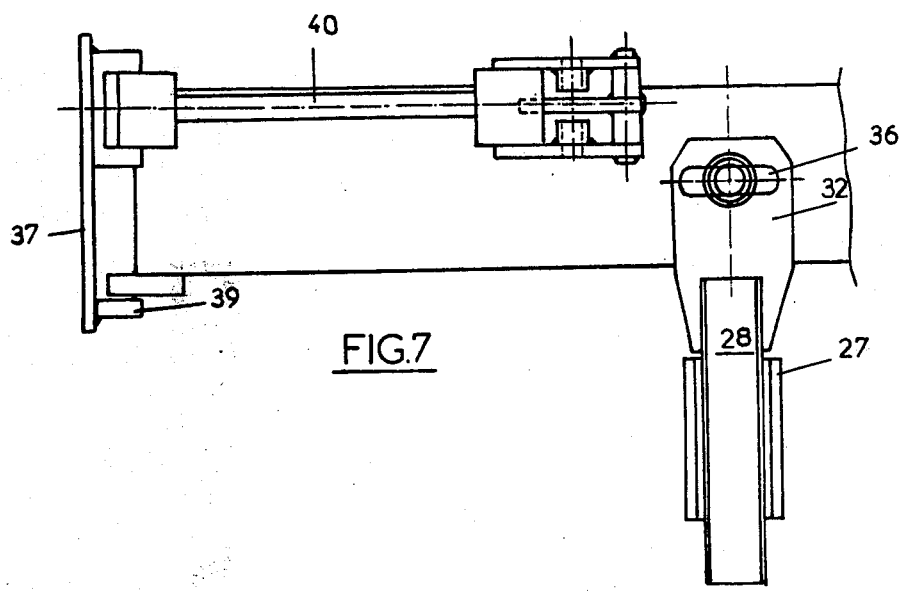
FIG. 7 is another partial view of the pivot bar, along line VII (FIG. 3).
Figure 8:
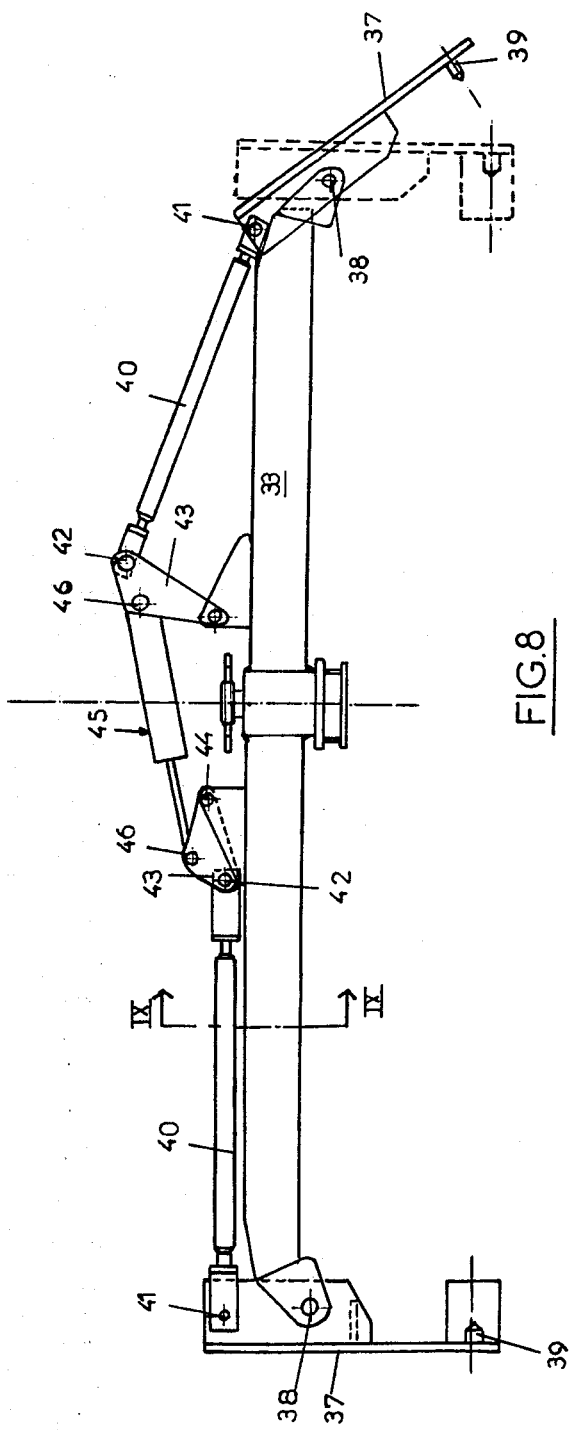
FIG. 8 is a view of the pivot bar on line VIII (FIG. 3).

The free end of the internal part 28 of the telescopic rod is integral with two side-plates 31 and 32 engaged on either side of a transverse pivot bar 33. The side-plate 31, located adjacent the base of the main part 21 of the bracket with respect to the pivot bar 33, comprises a circular aperture 34 receiving with slight clearance one of the ends of a pivot 35 engaged transversely in the central part of the pivot bar. The side-plate 32, located opposite the first side-plate with respect to the pivot bar, comprises an aperture 36 which is elongated transversely with respect to the major axis of the vehicle and which receives the other end of the pivot 35. This connecting device constitutes a type of universal joint between the bracket and the pivot bar, in order to allow the latter to "float" by oscillating about a central transverse position with respect to the vehicle (FIGS. 6 to 8).

Each free end of the pivot bar is pivoted on the central part of a door 37 by means of a pivot 38, whose axis is parallel to the major axis of the telescopic rod of the auxiliary part of the bracket 22.

One of the ends of each door 37 is provided, on its inner side, with a peg 39, whereas the other end of each door is pivoted on the end of a connecting rod 40 through the intermediary of a pivot 41 parallel to the pivot 38. Each rod 40 is pivoted by its opposite end on a pivot 42 of a triangular lever 43, whereof a second pivot 44 is pivoted on the pivot bar 33. A hydraulic ram 45 is pivoted by its ends between the two levers 43 by means of a third pivot 46 of these levers. The arrangement forms a pivoted mechanism whereof all the pivots are parallel and the relative dimensions of the variious components are selected such that when the ram 45 is contracted, the gates 37 open, which corresponds to an outwards movement of the pegs 39, whereas when said ram is extended, the doors close. This closing movement is terminated by slightly exceeding a dead point according to which the axes of the pivots 41, 42 and 44 are respectively aligned on each side, the pivot 42 being between the pivots 41 and 44 (FIG. 8).

The side of the pivot bar 33 which is directed towards the base of the main part 21 of the bracket is provided with a pivoted angle member 47 shown in detail in FIGS. 9 to 11.

The rear side of the angle member 47 comprises two pivot points 48 and 49 parallel to its major axis. A connecting rod 50 connects the pivot 48 to a pivot 51 integral with a support 52 welded to the pivot bar, adjacent the free end of the auxiliary part of the bracket. A connecting rod 53, which is longer than the connecting rod 50, connects the pivot 49 to a pivot 54 integral with the support 52 adjacent the base of the auxiliary part of the bracket. An abutment 55 integral with the pivot bar limits the pivoting movement of the connecting rod 50 in the direction of the base of the auxiliary part of the bracket, whereas the length of the connecting rod 53 is selected such that the latter is able to fold back substantially against the pivot bar in a position in which the pivot 48 is located slightly in front of a plane defined by the aligned pivots 49, 51 and 54.

The arrangement is provided to ensure loading, transportation and discharge of a standardised container 56 (FIG. 12) whatever the types of external reinforcement of said container, provided that the latter comprises a corner fitting 57 at each corner.

The operation is as follows.

To load a standardised container 56 placed on the ground, on a semi-trailer coupled behind a towing vehicle 48 (FIG. 12), one begins by aligning the semi-trailer with the container, in front of the latter, leaving a distance 58 of approximately 3 meters for example between the latter.

The ram 11 is extended, which causes the front connecting rods 5 to pivot rearwards, the latter in turn moving the pivoting chassis 4 rearwards, which pivots about the pivot 14 of the rear connecting rods 6 as long as the rollers 26 remain trapped by the rear upper extension 20 of the apertures 18. As soon as the stabilising roller 15 of the rear connecting rods 6 comes into contact with the ground, these connecting rods are no longer able to pivot (FIG. 13), but the front connecting rods 5 continue their movement, such that the rollers 16 escape from the extensions 20 to travel along the aperture 18 forming a guide. During this stage, the false chassis is supported for the major part by means of the roller 15 and no longer by the axles 2. At the end of the extension movement of the ram 11, the rear point 59 of the pivoting chassis 4 touches the ground (FIG. 14).

The ram 25 is then retracted in order to tilt the bracket 21-22 rearwards (FIG. 15) after making sure that the extension of the telescopic rod 27-28 corresponds to the height of the container 56 used.

If this is not the case, said telescopic rod is adjusted by withdrawing the locking spindle 30, then by rotating the screw 29 (FIG. 6) until the desired extension is obtained. The spindle 30 is then replaced in new holes.

When the pivot bar 33 is moved towards the container, the ram 45 is retracted such that the two doors 37 remain open (FIG. 8) and the vertical and horizontal forces exerted by the container on the inner sides of the angle member 47 (FIG. 10) tend to press the connecting rod 50 against the abutment 55 (front upper corner of the container filling the angle member 47).

When the angle member bears on the two upper and front sides of the corner fitting, on each side of the container, the doors 37 may once more be closed by extending the ram 45.

Each peg 39 on the door then automatically engages inside the hole 60 of a corner fitting.

It can be seen that attachment of the pivot bar to the container is possible, even if the semi-trailer is not perfectly aligned with respect to the container: alignment deficiencies are possibly compensated for by oscillations of the pivot bar between the side-plates 31 and 32. The driver of the tractor 48 controls the operation from his cab, possibly by acting on the steering of the tractor in order to re-centre the semi-trailer with respect to the container. Centering is facilitated by the fact that the attachment points of the pivot bar to the container are located at the top of the latter. The driver is thus able to see the upper part of the container from his cab, without having to move and without having to use an observer located at the rear.

The rams 25 are then extended (FIG. 16) in order to tilt the bracket 21-22 forwards. This movement produces the return of the arrangement of the semi-trailer and the false chassis 4 engages below the container, whereas the latter solely pivots about an axis corresponding to the line of contact of its lower corner fittings with the ground. The driver continues to act on the steering of the tractor in order to correct possible centering deficiencies.

During this time, the pegs 39 are moved slightly inside the holes 60, such that the angle member 47 is no longer in contact with the container. Rotation of the pivot bar 33 with respect to the container 56 creates a driving moment which has the effect of retracting the angle member, the connecting rod 50 pivoting in the opposite direction to the abutment 52 into the travelling position illustrated in FIG. 11.

When the bracket 21-22 reaches the end of its forward travel, the rear point 59 of the pivoting false chassis 4 engages below the rear lower corner fittings of the container. One then actuates a rear hydraulic locking device 62 (FIG. 2) which has the effect of re-centering the container exactly over its width. At the same time, this device ensures that the container is retained vertically during transportation by the rear lower corner fittings.

The rams 11 are then retracted to move the pivoting chassis 4 back in a forwards direction, the latter moving forwards whilst being supported on the ground by means of the stabilising roller 15 (FIG. 17). The roller 15 supported by the rear connecting rods 6 facilitates perfect counter-balancing of the semi-trailer, even when the centre of gravity 61 of the load is offset with respect to the axis of the two rear axles 2.

Slightly before the front ram 11 and the chassis 4 reach the end of their travel, the rollers 16 reach the rear end of the apertures 18 and once more engage in the extensions 20 and cause the connecting rods 6 to pivot forwards.

When the arrangement is ready for the road (FIG. 18), a safety device locks the rear locking device in the locked position. Unlocking is possible solely by carrying out an unloading operation bringing the rear connecting rods 6 into contact with the ground.

One of the main advantages of the semi-trailer according to the invention resides in the fact that gripping and support of the container are achieved exclusively by the standardised part of the latter, i.e. by the corner fittings. The semi-trailer is no longer equipped with a cable winch, as in known devices of the same type.

Furthermore, known semi-trailers frequently comprise a rear support stand, or stabilising stand, controlled independently of the pivoting chassis. When one moves back, there is a danger of the support rollers for these stands being jammed, if the ground is uneven, since these rollers have a small diameter. In this case, it is possible to eliminate this drawback by giving the device dimensions such that if the semi-trailer moves back, the stands constituted by the connecting rods 6 no longer rest on the ground if the pivoting chassis 4 touches the ground.

During the entire operation, the container is not pivoted by an angle greater than 25°, such that the maximum traction force to be exerted by means of the auxiliary part of the bracket 22 parallel to the pivoting chassis 4 always remains less than half the weight of the container. This is compatible with the norm relating to braking forces. According to this norm, the auxiliary part of the bracket should be able to withstand horizontal forces equal to half the weight of the container.

In addition, during transportation, the container rests on the semi-trailer by the four fixed supports constituted by the lower corner fittings and not on the locking devices.

Finally, the semi-trailer comprises several devices for ensuring safety and control of the operations from the cab of the tractor. In the case of a breakdown or any leakage of the hydraulic circuit, the locking devices for the container cannot be opened. Bypass and limiting devices ensure protection of the pressure unit and hydraulics, at the time when the rams reach the end of their travel, in particular. A safety device prevents actuation of the bracket when the container is ready for the road.

Another safety device is provided, in conjunction with the doors provided with anchoring pegs which are mounted on the pivot bar, in order that these doors cannot be opened either during loading of the container onto the semi-trailer, nor during travelling.

The semi-trailer is connected to the tractor 48 by flexible pipes and safety couplings. The tractor must be equipped with a high pressure hydraulic pump, a reservoir and a remote control emitter. The distribution unit is fixed to the semi-trailer.

I claim:

1. A semi-trailer vehicle comprising:
   a main chassis;
   a false chassis mounted to said main chassis and having a longitudinal guide therein, said longitudinal guide having an upward directed extension at the rear end thereof;
   means for connecting said main chassis to said false chassis, said connecting means comprising:
      a front pair of large connecting rods pivotally connected to said main chassis and to said false chassis;
      at least one double-acting ram pivoted by transverse pivots to the central part of the main chassis at one end and to the large connecting rods at the other end; and
      a rear pair of small connecting rods pivotally connected to the main chassis at one end and pivotally located in said longitudinal guide of said false chassis at a point other than said one end, whereby when said front pair of rods are at the end of their forwards pivotal movement, said rear pair of small connecting rods are located in the upward directed extension of said longitudinal guide, and rearward pivotal movement of said front pair of rods acts to tilt and slide said false chassis rearward by movement of said longitudinal guide passed said rear pair of rear connecting rods at the other end of said rear pair of connecting rods.

2. A vehicle according to claim 1 wherein said rear pair of rods comprises a transverse roller connected between said rear pair of rods at their other end for support on the ground and a second roller connected between said rear pair of rods wherein said rear pair of rods forms a bend in a longitudinal vertical plane of the semi-trailer and said second roller is pivotally connected in said guide at said bend.

3. A vehicle according to claim 1 wherein said false chassis further comprises:
   a bracket pivotally mounted thereto, said bracket comprising a main part pivotally connected at one end thereof to the center part of the false chassis and an auxiliary part substantially perpendicular to said main part and having means thereon for anchoring on a container; and
   a control ram one end of which is pivotally connected to the central portion of said main part and the other end of which is pivotally connected to the rear portion of said false chassis.

4. A vehicle according to claim 3 wherein said anchoring means comprises a pivot bar mounted to float on said auxiliary part whereby the major axis of said pivot bar oscillates about a substantially horizontal and transverse position.

5. A vehicle according to claim 4 wherein said auxiliary part further comprises:
   a first side plate disposed on the side of said pivot bar facing said false chassis, said first plate having a circular aperture;
   a second side plate disposed opposite said first plate on the side of said pivot bar opposite said false chassis, said second plate having a transverse elongated aperture; and
   a pivot pin fitted through said second plate, through said pivot bar, and closely through said first plate.

6. A vehicle according to claim 5 wherein said auxiliary part further comprises:
   two end doors pivotally attached one to each end of the pivot bar, said doors having engagement pegs on the chassis side and control means to actuate said doors from a longitudinal vertical plane of the semi-trailer to a horizontal position and back again so as to facilitate engagement of said pegs in lifting holes provided on standardized containers.

7. A vehicle according to claim 6 wherein said control means comprises a central ram pivotally connected to both doors so as to simultaneously actuate both doors.

8. A vehicle according to claim 7 wherein said auxiliary part further comprises at least one angle member parallel to said pivot bar and pivotally attached thereto by a short connecting rod and a long connecting rod so as to ensure loading, transportation, and discharge of standard containers with corner fittings.

9. A vehicle according to claim 8 wherein said pivot bar further comprises an abutment affixed thereto for limiting pivotal movement of one of said long and short connecting rods to ensure proper engagement of said at least one angle member with said corner fitting of said containers thereby ensuring alignment of said pegs with the lifting holes provided on a standardized container.

10. A vehicle according to claim 1 wherein said false chassis has parallel side members and said longitudinal guide of said false chassis is an elongated slot in each of said side members whereby when said front pair of large connecting rods are at their rearmost position, the false chassis is supported by the ground.

* * * * *

UNITED STATES PATENT AND TRADEMARK OFFICE
CERTIFICATE OF CORRECTION

PATENT NO. : 4,147,266
DATED : April 3, 1979
INVENTOR(S) : Antoine Corompt

It is certified that error appears in the above-identified patent and that said Letters Patent are hereby corrected as shown below:

Column 1, line 9, please delete "1,588,282" and insert therefore the number ----1,588,252----.

Column 3, line 49, please delete "The front connect-".

Column 3, line 50, please delete "ing rods 5 and a rear pair of connecting rods 6.".

Column 4, line 62, please delete the word "variious" and insert therefore the word ----various----.

Column 5, line 40, please delete the number "26" and insert therefore the number ----16----.

Signed and Sealed this

Seventeenth Day of July 1979

[SEAL]

Attest:

LUTRELLE F. PARKER
Attesting Officer
Acting Commissioner of Patents and Trademarks